(12) United States Patent
Katsaros

(10) Patent No.: US 11,821,466 B2
(45) Date of Patent: Nov. 21, 2023

(54) GROOVED NUT

(71) Applicant: AKTIEBOLAGET SKF, Gothenburg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 111 days.

(21) Appl. No.: 17/388,054

(22) Filed: Jul. 29, 2021

(65) Prior Publication Data
US 2022/0099143 A1    Mar. 31, 2022

(30) Foreign Application Priority Data
Sep. 29, 2020    (DE) .................. 102020125436.9

(51) Int. Cl.
| | | |
|---|---|---|
| F16C 35/00 | (2006.01) | |
| F16C 35/02 | (2006.01) | |
| F16B 37/00 | (2006.01) | |

(52) U.S. Cl.
CPC .............. F16C 35/02 (2013.01); F16B 37/00 (2013.01)

(58) Field of Classification Search
CPC .......... F16B 39/32; F16B 39/24; F16B 39/12; F16C 2326/02; F16C 35/063; B60B 27/0078

USPC .......................................................... 384/428
See application file for complete search history.

(56) References Cited

U.S. PATENT DOCUMENTS

| | | | | |
|---|---|---|---|---|
| 4,812,094 | A * | 3/1989 | Grube ..................... | F16C 25/06 301/124.1 |
| 5,597,278 | A * | 1/1997 | Peterkort .............. | F16B 39/108 411/134 |
| 7,811,038 | B2 * | 10/2010 | Jimenez .................. | F16B 39/32 411/326 |
| 7,927,052 | B1 * | 4/2011 | Varden .................. | F16B 39/108 411/197 |
| 9,062,705 | B2 * | 6/2015 | Jimenez ................. | F16B 41/002 |
| 2004/0096289 | A1 * | 5/2004 | Bydalek ................. | F16B 39/24 411/161 |
| 2004/0213646 | A1 * | 10/2004 | Jakuszeski ............. | F16B 2/065 411/544 |
| 2011/0027041 | A1 * | 2/2011 | Friesen ................... | F16B 39/26 411/313 |

* cited by examiner

Primary Examiner — Long T Tran
Assistant Examiner — James J Kim
(74) Attorney, Agent, or Firm — J-TEK LAW PLLC; Scott T. Wakeman; Mark A. Ussai

(57) ABSTRACT

A grooved nut for axially securing an inner ring of a bearing that is mounted on an axle or shaft includes a body portion surrounding a threaded inner bore. The body portion has a circumferential outer surface and an axial thickness, the outer surface includes at least one recess, and an axial depth of the recess is smaller than the axial thickness.

17 Claims, 3 Drawing Sheets

GROOVED NUT

CROSS-REFERENCE

This application claims priority to German patent application no. 10 2020 125 436.9 filed on Sep. 29, 2020, the contents of which are fully incorporated herein by reference.

TECHNOLOGICAL FIELD

The present disclosure is directed to a grooved nut for securing a bearing inner ring on a shaft.

BACKGROUND

In many applications, such as, for example, vehicle axles, axle nuts are used in order to fix a wheel bearing assembly on an axle. Here the wheel bearing assembly serves as a connecting element between a rotating element, such as, for example, a motor vehicle wheel, and a stationary element, such as, for example, a vehicle axle. If, for example, the wheel bearing assembly is realized by a wheel bearing unit, the wheel bearing assembly can be installed on the axle of the vehicle and secured by an attachment element axially and tangentially against displacement or rotation. Here the attachment element supports the entire axial operating load and transmits it, for example, via a thread by which the attachment element is attached to the axle, to the axle, wherein in particular high clamping forces between the inner rings of a bearing can be required, which clamping forces are generated by very high tightening torques on the attachment element.

However, with certain attachment elements, such as, for example, grooved nuts or slotted nuts, whose use is particularly advantageous when an available axial installation space limited, under certain conditions these high axial clamping forces can lead to high deformations. These deformations can in particular result in a loss of clamping strength, a service life reduction of the wheel bearing assembly, and in the extreme case a total failure of the wheel bearing unit.

Grooved nuts usually have an annular shape, and the eponymous grooves are uniformly distributed around the grooved nut on an outer circumference. This causes the grooved nuts to have a segmented shape circumferentially, since the grooves are axially continuous. However, if the segmented region of the outer circumference of the grooved nut is loaded with a high axial load, the grooved nut can yield and conically deform the cylindrical threaded bore.

This conical deformation in turn causes the first threads of the screw connection to be unloaded and the last threads to be loaded by the equal axial load. The additional loading of the last threads is therefore higher the more the grooved nut is conically deformed. If the thread of the grooved nut is severely conically deformed, more and more threads are unloaded in the front region, and the last two to three threads are so heavily stressed that they yield plastically and the clamping force or the preload is lost.

SUMMARY

It is therefore an aspect of the present invention to provide a grooved nut that is more resistant to deformation.

In the following a grooved nut is disclosed for axially securing an inner ring of a bearing that is mounted on an axle or a shaft. The inner ring can be a fixed ring or a ring that rotates with the shaft. The grooved nut has a thickness D in an axial direction of the axle, a central bore having an inner diameter having a thread and an outer circumferential surface having at least one recess on its outer circumferential surface. In order to configure the grooved nut to be more stable against deformation even with an unfavorable application of force, a depth t of the recess is smaller in the axial direction than the axial thickness D of the grooved nut. That is, the recess does not extend over the full axial thickness of the grooved nut. In contrast to known grooved nuts, the outer circumference of the disclosed grooved nut is thereby not continuously segmented, and a conical deformation of the threaded bore of the grooved nut can be reduced in comparison to a conventional grooved nut.

The grooved nut is preferably provided with a plurality of recesses that are uniformly distributed circumferentially. In addition, the dimensions of the recess can be chosen in in particular such that a grooved-nut wrench or C-wrench is usable in the groove.

In addition, the axial depth t of the recess can be $0.3D<t<0.7D$, preferably $0.4D<t<0.6D$, wherein D is the axial thickness of the grooved nut. Furthermore, the grooved nut has a width B in the radial direction, and a radial depth b of the recess can be between $0.4B<b<0.6B$. A deforming of the grooved nut can thereby also be counteracted.

According to a further embodiment, the grooved nut has an L-shaped profile in the section through the recess. The L-shaped profile can further reduce the deformation of the grooved nut.

According to a further embodiment, the grooved nut has a step-shaped form including a first ring part and a second ring part. The at least one recess is provided in an outer circumferential surface of the first ring part, and an outer diameter of the second ring part is greater than an outer diameter of the first ring part. The first ring part and the second ring part are preferably formed one-piece. The second ring part thus forms a type of flange that extends radially and protrudes beyond the first ring part. The first ring part preferably has a radial width $B_1$ and the second ring part a radial width $B_2$, wherein the radial width $B_2$ of the second ring is between $1.2B_1<B_2<2B_1$. A deformation of the grooved nut can thereby be further reduced.

Another aspect of the disclosure comprises a grooved nut for axially securing an inner ring of a bearing that is mounted on an axle or shaft. The grooved nut includes a unitary body portion having a first ring section and a second ring section. The first ring section has a threaded cylindrical interior having an inner diameter, an outer circumferential surface having a first outer diameter, and an axial surface extending from the interior to the outer circumferential surface. The second ring section has a threaded cylindrical interior having the diameter and an outer circumferential surface having a second outer diameter, the second outer diameter being greater than the first outer diameter. The upper ring section includes a plurality of recesses each extending radially into the outer circumferential surface of the upper ring section and axially into the axial surface of the upper ring section. The plurality of recesses do not extend into the lower ring section, and the cylindrical interior of the first ring section is contiguous with the cylindrical interior of the second ring section.

According to a further aspect, an assembly is proposed that includes a bearing, an axle or a shaft, and at least one grooved nut described above.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
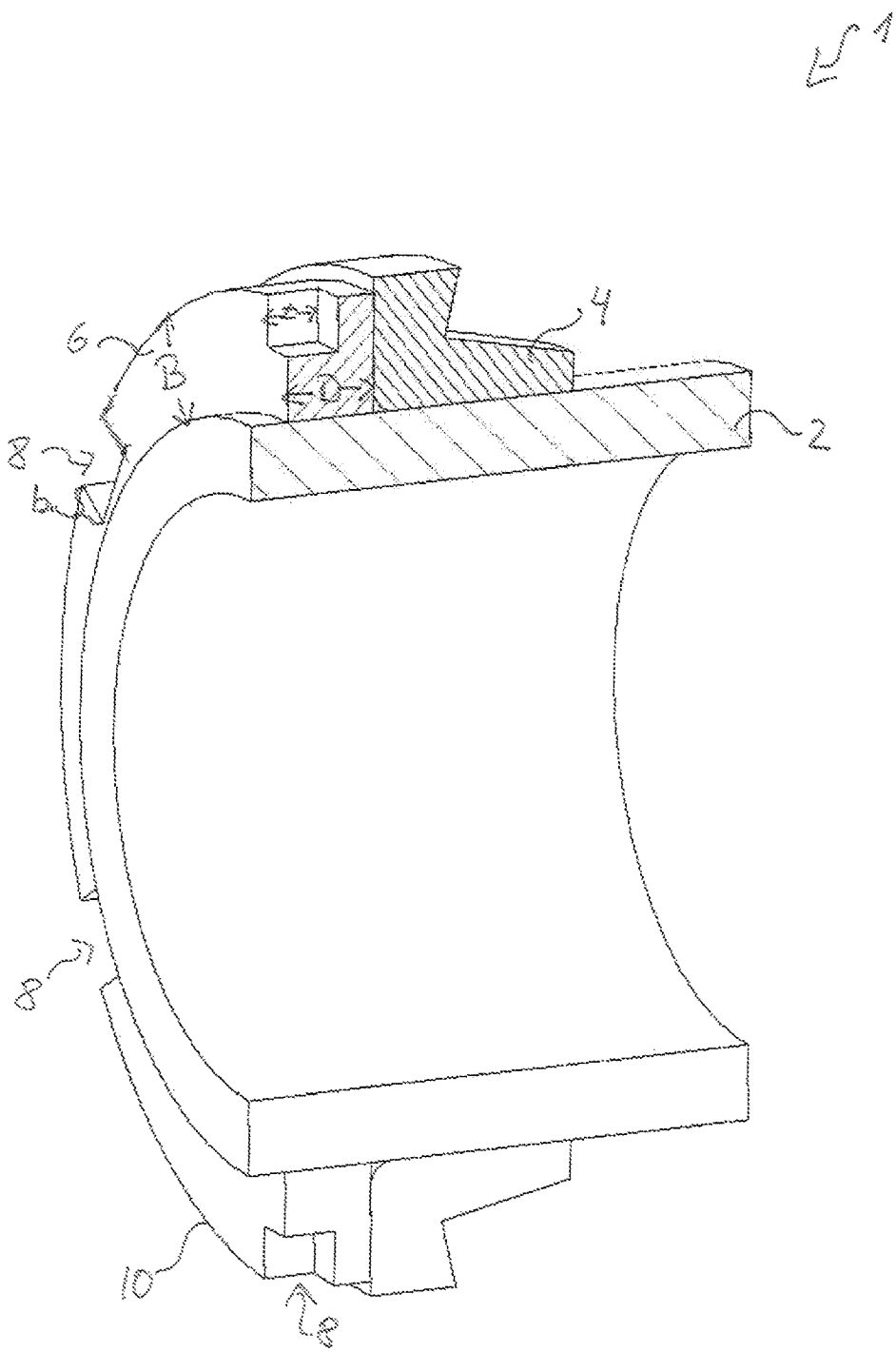
FIG. 1 is a cross-sectional view of an assembly including an axle, an inner ring of a bearing and a grooved nut according to one embodiment of the present disclosure.

FIG. 1 shows a schematic cross-sectional view through an assembly 1 that includes an axle 2, an inner ring 4, and a grooved nut 6 according to a first embodiment. The grooved nut 6 has a central opening having an inner diameter, and the opening includes a thread, in particular a fine thread, that interacts with an external thread on the axle 2. The inner ring 4 can thereby be secured on the axle 2 by the grooved nut 6.

The grooved nut has an outer circumferential surface 10 and both a radial width B and an axial thickness D. Furthermore, the grooved nut 6 includes a plurality of recesses 8 on its outer circumferential surface 10, which recesses 8 can in particular be uniformly circumferentially distributed on the outer circumferential surface 10 of the grooved nut 6. The recesses 8 of the grooved nut 6 each have a radial depth b and an axial depth t. The plurality of recesses 8 are preferably essentially identical in their dimensions.

The axial depth T of the recess 8 can advantageously be between 30% and 70%, preferably between 40% and 60%, of the axial thickness D of the grooved nut 6, i.e., $0.3D<T<0.7D$, preferably $0.4D<T<0.6D$. The smaller the axial depth T of the recess in comparison to the axial thickness D, the more stable the grooved nut 6 becomes. Furthermore, the grooved nut 6 has a radial width B, wherein the radial depth b of the recess 8 can be between 40% and 60% of the radial width B of the grooved nut 6, i.e., $0.4B<b<0.6B$.

Figure 2:
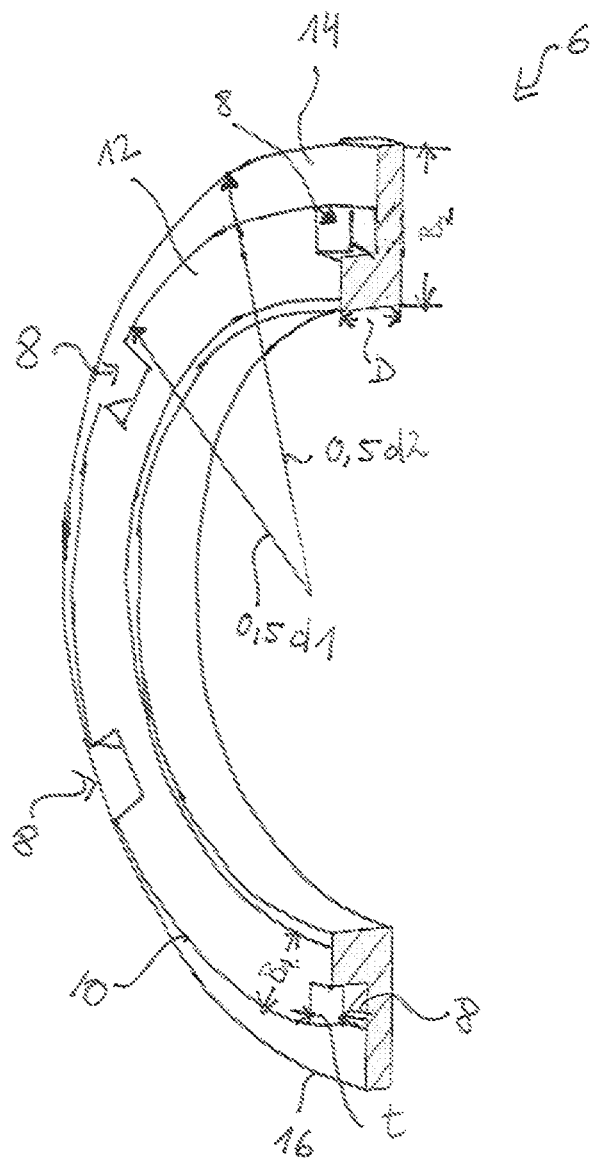
FIG. 2 is a cross-sectional view of a grooved nut according to a further embodiment of the present disclosure.

FIG. 2 shows a cross-sectional view of a grooved nut 6 according to a further embodiment. The grooved nut 6 of FIG. 2 has a step-shaped form including a first ring part 12 and a second ring part 14, which can in particular be formed one-piece. Here the recesses 8 are provided in an outer circumferential surface 10 of the first ring part 12.

Furthermore, an outer diameter d1 of the outer circumferential surface 10 of the first ring part 12 is smaller than an outer diameter of the outer circumferential surface 16 of the second ring part 14, or in other words the second ring part 14 has a greater outer diameter than the first ring 12, whereby the grooved nut 6 has an L-shaped profile in cross-section. For the sake of better clarity, the half outer diameters 0.5d1 and 0.5d2 are delineated in FIG. 2. Here the first ring part 12 has a radial width $B_1$, and the second ring part 14 has a radial width $B_2$. The radial width $B_2$ of the second ring part 14 is preferably between $1.2B_1<B_2<2B_1$.

Due to the greater radial extension of the second ring part 14, in does not include any of the recesses 8, the stability of the grooved nut 6 of FIG. 2 can be further increased against a conical deformation in comparison to the grooved nut 6 of FIG. 1. This can be seen in particular in FIG. 3, which illustrates the relative deformations of the threads of the grooved nut from FIG. 1, the grooved nut from FIG. 2, and a conventional grooved nut.

Figure 3:
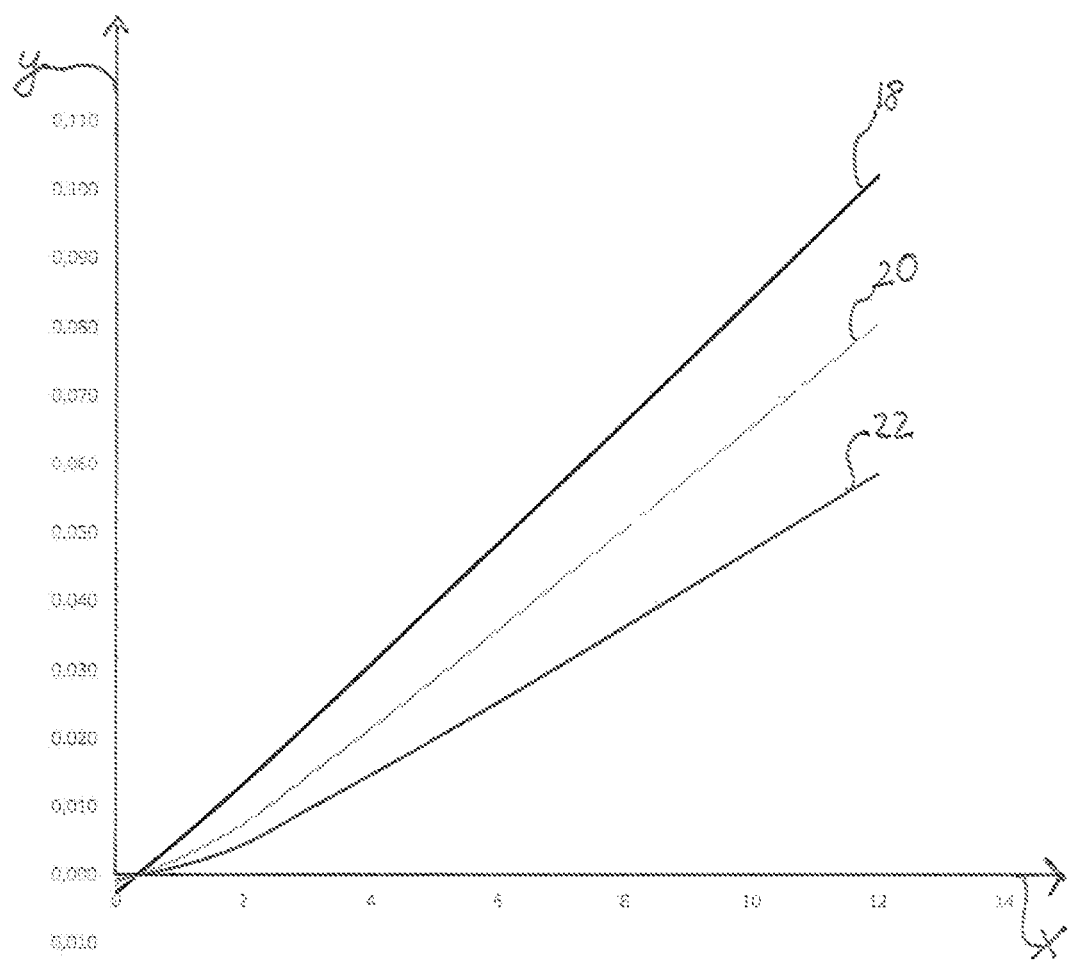
FIG. 3 is a diagram that shows the relative amounts of deformation experienced by the grooved nut of FIG. 1, the grooved nut of FIG. 2, and a conventional grooved nut.

In FIG. 3, the x-axis shows a length of the threaded bore in millimeters, wherein the origin corresponds to the side of the grooved nut 6 that is most distant from the inner ring 6. The deformation of the threaded bore in millimeters is plotted on the y-axis. The line 18 represents a conventional grooved nut from the prior art, the line 20 represents the grooved nut 6 of FIG. 1, and the line 22 represents the grooved nut 6 of FIG. 2.

Grooved nuts 8 usually have an annular shape. However, if the grooved nut 6 is loaded with a high axial load, the grooved nut 6 can yield, in which case the cylindrical threaded bore that is provided on the inner diameter of the central opening can conically deform. This conical deformation can cause the first threads of the screw connection to be unloaded and the last threads to be loaded by the equal axial load. The additional loading of the last threads therefore becomes higher the more conically the grooved nut 6 is deformed. If the thread of the grooved nut is severely conically deformed, more and more threads in the front region, i.e., in the region where the grooved nut 6 has contact with the inner ring 2, are unloaded, and the last two to three threads, i.e., the threads that are most distant from the inner ring 2, are so heavily stressed that they can yield plastically and the clamping force or the preload can be lost.

In the grooved nut 6, the axial depth t of the recess is smaller than the axial thickness D of the grooved nut 6. i.e., the grooved nut 6 is continuous on its front side facing the inner ring 4. Since the recesses 8 do not completely pass through the grooved nut 6 in the axial direction, the stability of the grooved nut 6 can be increased against a conical deformation in this region, and the conical deformation of the threaded bore can be reduced.

As can be seen in FIG. 3, the proposed grooved nut 6 of FIG. 1 can reduce the conical deformation of the threaded bore by up to 24% in comparison to the conventional grooved nut, with the assumption that the axial load is applied onto exactly the same surface. The grooved nut 6 results in a reduction of the deformation of the threaded bore by up to 45% in comparison to the conventional grooved nut, again with the assumption that the axial load is applied onto exactly the same surface.

In summary, the ability of the grooved nut 6 to resist a conical deformation by an axial load can be increased by the reduced depth T of the recess 8. Furthermore, the stability can be increased by a radial flange-type extension of the grooved nut.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved grooved nuts.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Assembly
2 Axle
4 Inner ring
6 Grooved nut
8 Recess
10 Outer circumference
12 First ring
14 Second ring
16 Outer circumference
18 Line
20 Line
22 Line
t Axial depth
D Axial thickness
d1 Outer diameter
d2 Outer diameter
B, $B_1$, $B_2$ Radial width
b Radial depth

What is claimed is:

1. A grooved nut for axially securing an inner ring of a bearing that is mounted on an axle or shaft, the grooved nut comprising:
    a body portion surrounding a threaded inner bore, the body portion having a circumferential outer surface and an axial thickness,
    wherein the outer surface includes at least one recess,
    wherein an axial depth of the recess is smaller than the axial thickness,
    wherein the body portion has a width B in the radial direction,
    wherein the recess has a radial depth b, and
    wherein b<B.

2. The grooved nut according to claim 1,
    wherein t is the axial depth,
    wherein D is the axial thickness, and
    wherein $0.3D<t<0.7D$.

3. The grooved nut according to claim 1,
    wherein t is the axial depth,
    wherein D is the axial thickness, and
    wherein $0.4D<t<0.6D$.

4. A grooved nut for axially securing an inner ring of a bearing that is mounted on an axle or shaft, the grooved nut comprising:
    a body portion surrounding a threaded inner bore, the body portion having a circumferential outer surface and an axial thickness,
    wherein the outer surface includes at least one recess,
    wherein an axial depth of the recess is smaller than the axial thickness,
    wherein the body portion has a width B in the radial direction, and
    wherein the recess has a radial depth b, and
    wherein $0.4B<b<0.6B$.

5. The grooved nut according to claim 1, wherein the body portion has an L-shaped profile in a section through one of the at least one recess.

6. The grooved nut according to claim 1,
    wherein the body portion includes a first ring part and a second ring part, the second ring part being axially adjacent to the first ring part and coaxial with the first ring part,
    wherein the at least one recess is provided in an outer circumferential surface of the first ring part and does not extend into the second ring part, and
    wherein an outer diameter of the second ring part is greater than an outer diameter of the first ring part.

7. The grooved nut according to claim 6,
    wherein the first ring part has a radial width $B_1$ and the second ring part a radial width $B_2$, and
    wherein $1.2B_1<B_2<2B_1$.

8. The grooved nut according to claim 1, wherein the at least one recess comprises a plurality of evenly circumferentially distributed recesses.

9. An assembly comprising:
    a bearing having an inner ring mounted on an axle or shaft, and
    a grooved nut according to claim 1 holding the bearing on the axle or shaft.

10. The grooved nut according to claim 1,
    wherein the body portion includes an axial surface extending from the inner bore to the outer surface, and
    wherein the at least one recess comprise a plurality of recesses, and
    wherein each of the plurality of recesses is open to the axial surface.

11. A grooved nut for axially securing an inner ring of a bearing that is mounted on an axle or shaft, the grooved nut comprising:
    a unitary body portion comprising:
    a first ring section having a threaded cylindrical interior having an inner diameter, an outer circumferential surface having a first outer diameter, and an axial surface extending from the interior to the outer circumferential surface, and
    a second ring section having a threaded cylindrical interior having the diameter and an outer circumferential surface having a second outer diameter, the second outer diameter being greater than the first outer diameter,
    wherein the first ring section includes a plurality of recesses each extending radially into the outer circumferential surface of the first ring section and axially into the axial surface of the first ring section,
    wherein the plurality of recesses do not extend into the second ring section, and
    wherein the cylindrical interior of the first ring section is contiguous with the cylindrical interior of the second ring section.

12. The grooved nut according to claim 11,
wherein the first ring section has a width B in the radial direction,
wherein the recess has a radial depth b, and
wherein b<B.

13. The grooved nut according to claim 12,
wherein an axial depth of each of the plurality of recesses is less than an axial thickness of the first ring section.

14. The grooved nut according to claim 11,
wherein an axial depth of each of the plurality of recesses is less than an axial thickness of the first ring section.

15. The grooved nut according to claim 11,
wherein t is an axial depth of the recesses,
wherein D is an axial thickness of the first ring section, and
wherein $0.3D<t<0.7D$.

16. The grooved nut according to claim 11,
wherein t is an axial depth of the recesses,
wherein D is an axial thickness of the first ring section, and
wherein $0.4D<t<0.6D$.

17. The grooved nut according to claim 4,
wherein the body portion includes a first ring part and a second ring part, the second ring part being axially adjacent to the first ring part and coaxial with the first ring part,
wherein the at least one recess is provided in an outer circumferential surface of the first ring part and does not extend into the second ring part, and
wherein an outer diameter of the second ring part is greater than an outer diameter of the first ring part.

* * * * *